(No Model.)

R. B. BEAUMONT.
GELATINOUS FOOD PRODUCT.

No. 480,687. Patented Aug. 9, 1892.

WITNESSES:

Richard B. Beaumont
INVENTOR

UNITED STATES PATENT OFFICE.

RICHARD B. BEAUMONT, OF RUTHERFORD, NEW JERSEY.

GELATINOUS FOOD PRODUCT.

SPECIFICATION forming part of Letters Patent No. 480,687, dated August 9, 1892.

Application filed April 11, 1892. Serial No. 428,723. (No specimens.)

*To all whom it may concern:*

Be it known that I, RICHARD B. BEAUMONT, of Rutherford, in the county of Bergen and State of New Jersey, have invented a new and useful Improvement in Gelatinous Food Products, of which the following is a specification, reference being had to the annexed drawings, forming a part thereof, in which—

Figure 1:
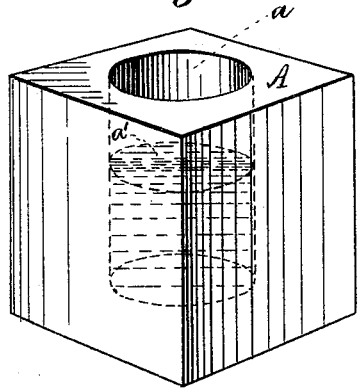
Figure 2:
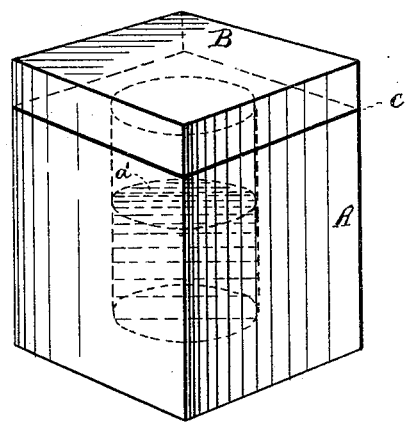
Figure 3:
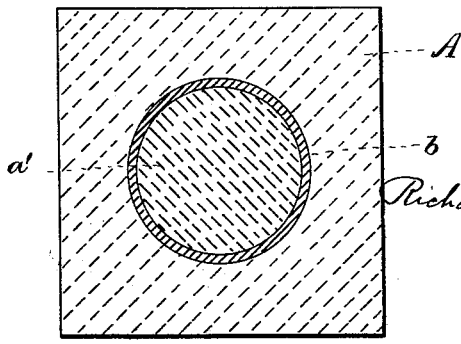

Figure 1 is a vertical transverse section of a block of gelatine prepared according to my improvement. Fig. 2 is a horizontal section of the same, and Fig. 3 is a vertical section of a modified form.

Similar letters of reference indicate corresponding parts in all the views.

The object of my invention is to provide a gelatinous food product or mass in which a portion or all of the flavoring material required for the mass will be contained, but without admixture with the gelatinous mass, and which will require no other preparation for the table than the addition of water, milk, or other fluids.

My invention consists in the combination, with a gelatinous food product, mass, or jelly made in the form of a receptacle or containing-vessel, of a suitable flavoring material contained in a cavity of the jelly, but not combined with the jelly, the finished product forming a commercial article, which may be stored or transported and the elements of which when diluted and cooled form a homogeneous edible food suitably flavored and ready for the table.

In carrying out my invention I prepare a suitable gelatinous food compound and cast it so as to form a cavity or vessel of any desired shape or size, and in this gelatinous vessel thus made I place the flavoring material—such as wine, fruit-extracts, liquors, confections, fruit or essence of fruit, or any extract or mixture—and close and seal the cavity. Any flavoring materials may be employed.

In the present example I have shown a food mass A, chiefly consisting of jelly, cast in a cubical form, with a cavity $a$ in the center thereof, the said cavity being partly or wholly filled with a flavoring material $a'$ and closed by a cover B of the same composition as the mass A, the said cover being hermetically sealed upon and attached to the mass by a melted portion of the same composition placed in the joint $c$ between the parts A B.

In the form shown in Fig. 3, instead of placing the flavoring material $a'$ directly in the cavity in the mass $a$, I have placed it in a separate gelatinous capsule $b$, made in the ordinary manner, or I compose the capsule of the same material as the food product herein described, and I insert the capsule in the following manner: I partially fill the mold in which my improved product is cast. Then place the capsule containing the flavoring material in the mold. Then pour in the remainder of the food product that constitutes the complete cube, thus inclosing and hermetically sealing the flavoring matter or material within the food product.

Any suitable formula may be used for the preparation of the gelatinous food product. The following is a desirable one, although I do not confine myself to this particular combination or compound: glucose, one pound; sugar, five pounds; gelatine, one and one-half pounds; citric acid, one ounce.

In preparing this compound the gelatine is dissolved in a suitable quantity of water, the glucose and sugar boiled, and citric acid added, and then mixed so as to form a solidified mass, body, or compound.

It is obvious that the gelatinous food product may be molded, shaped, or cast in any desired form. Therefore I do not limit or confine myself to any particular shape; but in general the form shown is preferred on account of facility in packing.

Having thus described my invention, I claim as new and desire to secure by Letters Patent—

As an improved article of manufacture, a gelatinous food product and its flavoring material, made substantially as herein shown and described, consisting of a prepared gelatinous food compound or mass carrying its flavoring materials wholly or in part within a sealed cavity or chamber formed within the food mass and the whole adapted to be made ready for eating by dissolving and cooling, all as set forth.

RICHARD B. BEAUMONT.

Witnesses:
 THEO. T. WHITMARST,
 JOHN B. LORD.